(12) United States Patent
Skafte

(10) Patent No.: US 12,442,207 B2
(45) Date of Patent: Oct. 14, 2025

(54) REINFORCEMENT OF WIND TURBINE STRUCTURES

(71) Applicant: Vestas Wind Systems A/S, Aarhus N (DK)

(72) Inventor: Anders Skafte, Egå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 104 days.

(21) Appl. No.: 18/040,889

(22) PCT Filed: Aug. 4, 2021

(86) PCT No.: PCT/DK2021/050255
§ 371 (c)(1),
(2) Date: Feb. 7, 2023

(87) PCT Pub. No.: WO2022/042808
PCT Pub. Date: Mar. 3, 2022

(65) Prior Publication Data
US 2023/0287696 A1    Sep. 14, 2023

(30) Foreign Application Priority Data

Aug. 26, 2020 (DK) .......................... PA 2020 70551

(51) Int. Cl.
*E04G 23/02* (2006.01)
*F03D 13/20* (2016.01)

(52) U.S. Cl.
CPC ..... *E04G 23/0218* (2013.01); *E04G 23/0225* (2013.01); *F03D 13/20* (2016.05)

(58) Field of Classification Search
CPC .. E04G 23/0225; E04G 23/0218; F03D 13/20
(Continued)

(56) References Cited

U.S. PATENT DOCUMENTS 8,220,214 B1 * 7/2012 Purdy ................... E02D 27/42
52/223.13
8,234,837 B2 * 8/2012 Koren ....................... E04C 3/30
52/843

(Continued)

FOREIGN PATENT DOCUMENTS

CN     101490413 A     7/2009
CN     204754274 U     11/2015
(Continued)

OTHER PUBLICATIONS

International Searching Authority, International Search Report and Written Opinion issued in corresponding PCT Application No. PCT/DK2021/050255, mailed Oct. 18, 2021.
(Continued)

*Primary Examiner* — Paola Agudelo
(74) *Attorney, Agent, or Firm* — Wood Herron & Evans LLP

(57) ABSTRACT

An aspect of the invention relates to a method of reinforcing a tubular wind turbine structure using a radially adjustable ring stiffener. The ring stiffener comprises a pair of adjacent ring segments coupled together by a coupling means configured to permit radial adjustment of the ring stiffener by varying an intersegmental separation between adjacent ends of those ring segments. The method comprises: positioning the ring stiffener at a reinforcement position within the tubular wind turbine structure; and adjusting the intersegmental separation between the pair of adjacent ring segments to increase the radius of the ring stiffener; and thereby to engage an inner surface of the tubular wind turbine structure with a radial force that holds the ring stiffener at the reinforcement position by means of friction between the ring stiffener and the tubular wind turbine structure.

18 Claims, 10 Drawing Sheets

(58) Field of Classification Search
USPC .......................................................... 52/745.17
See application file for complete search history.

(56) References Cited

U.S. PATENT DOCUMENTS

| | | | | |
|---|---|---|---|---|
| 8,651,819 | B2* | 2/2014 | Giuffre | F03D 1/0675 |
| | | | | 416/209 |
| 9,166,274 | B2* | 10/2015 | Bennett | E04H 12/085 |
| 9,260,875 | B2* | 2/2016 | Bjoernskov | E04B 1/92 |
| 9,850,674 | B1* | 12/2017 | Paura | F03D 13/10 |
| 10,794,365 | B2* | 10/2020 | Longeru | F03D 13/20 |
| 11,118,570 | B2* | 9/2021 | Lancha Fernandez | |
| | | | | E04H 12/16 |
| 11,473,562 | B2* | 10/2022 | Cao | B26D 3/24 |
| 2005/0078049 | A1* | 4/2005 | Trankina | H01Q 1/1242 |
| | | | | 343/890 |
| 2005/0183364 | A1* | 8/2005 | Cash | E04H 12/2292 |
| | | | | 52/296 |
| 2011/0210233 | A1* | 9/2011 | Fang | F03D 13/20 |
| | | | | 248/673 |
| 2013/0115054 | A1* | 5/2013 | Yokoyama | F03D 13/20 |
| | | | | 415/126 |
| 2013/0183158 | A1* | 7/2013 | Giuffre | F03D 80/00 |
| | | | | 156/349 |
| 2014/0377072 | A1* | 12/2014 | Moore | F03D 1/0633 |
| | | | | 416/204 A |
| 2014/0377078 | A1 | 12/2014 | Bagepalli et al. | |
| 2018/0112426 | A1* | 4/2018 | Cooper | F03D 80/50 |
| 2020/0158089 | A1* | 5/2020 | Zhang | B23P 15/00 |
| 2022/0298820 | A1* | 9/2022 | Madsen | E04H 12/342 |
| 2023/0287696 | A1* | 9/2023 | Skafte | E04H 12/12 |

FOREIGN PATENT DOCUMENTS

| | | |
|---|---|---|
| CN | 107725281 A | 2/2018 |
| CN | 109577734 A | 4/2019 |
| CN | 209855969 U | 12/2019 |
| CN | 111075246 A | 4/2020 |
| CN | 111379669 A | 7/2020 |
| EP | 1561883 A1 | 8/2005 |
| EP | 2345810 A1 | 7/2011 |
| EP | 2617990 A1 | 7/2013 |
| EP | 2924282 A1 | 9/2015 |
| ES | 2716935 A1 | 6/2019 |
| JP | 2003018732 A | 1/2003 |

OTHER PUBLICATIONS

Danish Patent and Trademark Office, First Technical Examination and Search Report issued in corresponding DK Application No. PA 2020 70551, mailed Feb. 10, 2021.

China National Intellectual Property Administration, office action issued in corresponding CN Application No. 20218005184136, dated Jun. 23, 2025.

* cited by examiner

REINFORCEMENT OF WIND TURBINE STRUCTURES

FIELD OF THE INVENTION

This invention generally relates to wind turbine structures and, in particular, to a method of reinforcing a tubular wind turbine structure.

BACKGROUND

A conventional design of a horizontal axis wind turbine comprises a tower and a nacelle. The nacelle is mounted on top of the tower and supports a rotor with a set of blades and power generating equipment for converting the kinetic energy of the wind into electrical energy. The tower is commonly constructed from a series of tubular sections, often made of steel or concrete, that are individually transported to the installation site, where they are stacked on top of each other and joined together to form the tower structure.

With the drive towards reducing the overall cost of energy, wind turbines have increased in size over the past few decades, and this presents some significant design challenges. Larger nacelles and rotors require stronger supporting structures, which tends to mean that wind turbine tower sections are made with increased wall thicknesses. However, this increases the material cost of such towers and also challenges conventional installation approaches. To reduce costs, a known approach is to minimise the wall thicknesses of the tubular sections of the tower, so that lighter and more economical towers can be produced. However, reducing the wall thickness of a tower must be done with care as it also reduces the strength of the tower, which can cause structural vulnerabilities.

A known approach to reducing the mass of a wind turbine tower without compromising its strength includes constructing the tower with thicker tubular sections in the areas that are identified as being most susceptible to structural weaknesses. However, this method is often too expensive as it potentially adds lots of unnecessary material to the tower.

Another approach is to reinforce the vulnerable sections of the tower by welding ring stiffeners to the internal or external walls of the tower. This approach effectively enlarges, or reinforces, the cross-section of the tower in critical areas. In turn, this has the effect of reducing a buckling length of the tower section and increasing the resistance of the tower to buckling, thereby increasing the strength of the tower and mitigating any structural vulnerability.

However, one problem with the second approach is that the welding process heats the walls of the tower and hotspots, that may be formed by the heat of the welding process, can have the consequence of reducing the fatigue strength of the tower.

It is against this background that the invention has been devised.

SUMMARY OF THE INVENTION

According to an aspect of the invention, there is provided a method of reinforcing a tubular wind turbine structure using a radially adjustable ring stiffener. The ring stiffener comprises a pair of adjacent ring segments coupled together by a coupling means configured to permit radial adjustment of the ring stiffener by varying an intersegmental separation between adjacent ends of those ring segments. The method comprises: positioning the ring stiffener at a reinforcement position within the tubular wind turbine structure; and adjusting the intersegmental separation between the pair of adjacent ring segments to increase the radius of the ring stiffener; and thereby to engage an inner surface of the tubular wind turbine structure with a radial force that holds the ring stiffener at the reinforcement position by means of friction between the ring stiffener and the tubular wind turbine structure.

Advantageously, the method is configured so that the ring stiffener remains in position, attached to the tubular wind turbine structure, (solely) by means of friction, i.e. without any fastenings or welding arranged between the ring stiffener and the wind turbine structure.

Hence, the method is advantageously configured to reinforce a wind turbine structure and, particularly, to mitigate an area of structural weakness, without reducing the fatigue strength of the wind turbine structure (for example through the formation of hotspots).

In an embodiment the ring stiffener is inserted into a tower after construction of the turbine. Also the turbine may have been in operation for some time.

In an embodiment the ring stiffener is inserted into a tower during partial repowering of the turbine, where the tower is reused. Partial repowering includes replacing and/or upgrading one or more components of the wind turbine. The ring stiffener makes it possible to increase the life of the tower in an easy and economical way by installing the ring stiffener in weak spots. The location can be established based on a tower strength assessment.

The radius of the ring stiffener may, for example, be increased to the extent that an interference fit, or a friction fit, forms between the ring stiffener and an inner surface of the wind turbine structure, holding the ring stiffener in position by means of friction. In other words, the radius of the ring stiffener may be increased so as to be equal to, or greater than, an inner radius of the tubular wind turbine structure.

In an example, the coupling means may take the form of an adjustable coupling means operable to control the intersegmental separation between the pair of adjacent ring segments. By 'control' it is intended to mean that the adjustable coupling means may selectively set, hold, or otherwise maintain the intersegmental separation when desired. Adjusting the intersegmental separation between the pair of adjacent ring segments comprises operating the adjustable coupling means.

For example, the adjustable coupling means may include an adjustable spacing element, or device, that extends between the adjacent ring segments, holding the adjacent ends of those ring segments apart. Such adjustable coupling means may be used in combination with actuations means that force the plurality of ring segments radially outward (in order to set the increased the intersegmental separation).

In an example, the adjustable coupling means may include a biasing means configured to urge the adjacent ends of the ring segments apart.

In an example, the adjustable coupling means may include an actuator operable to vary the intersegmental separation between the adjacent ends of the ring segments. Adjusting the intersegmental separation between the pair of adjacent ring segments may, for example, comprise operating the actuator to urge the pair of adjacent ring segments apart.

In other words, the actuator may be operated to generate an actuation force that urges the adjacent ends of the ring segments apart (against the resistance of the inner surface of the tubular wind turbine structure).

In an example, the actuator may be a linear actuator. For example, the actuation force may be generated by linear expansion of the actuator between the adjacent ends of the ring segments. In other examples, the actuator may be a rotary actuator.

The actuator may be one of: a pneumatic actuator; a mechanical actuator; a hydraulic actuator; or an electrical actuator, for example.

In an example, the linear actuator may comprise a leadscrew mechanism connected between the pair of adjacent ring segments. The leadscrew mechanism may be operable to urge the pair of adjacent ring segments apart, for example.

Optionally, the leadscrew mechanism may engage a pair of opposing walls at the adjacent ends of the ring segments.

In an example, the adjustable coupling means may take the form of a fastening arrangement. The fastening arrangement may include the leadscrew mechanism, which may, for example, comprise: a threaded rod, a first fastening element, and a second fastening element, of the fastening arrangement. The first and second fastening elements may be mounted on the threaded rod between the pair of opposing walls, with the first fastening element bearing against a first one of the opposing walls and the second fastening element bearing against a second one of the opposing walls. Operating the leadscrew mechanism may, for example, comprise turning at least one of the first and second fastening elements along the threaded rod to increase a distance between the first and second fastening elements and thereby to the urge the pair of adjacent ring segments apart.

In this manner, the ring stiffener may be adjustable by virtue or a fastening arrangement between the adjacent ring segments that also serves to couple the adjacent ring segments together.

In an example, the method may further comprise securing the engagement between the ring stiffener and the tubular wind turbine structure by fixing the intersegmental separation between the pair of adjacent ring segments. In this context, the intersegmental separation may be rigidly fixed by permanent means.

Fixing the intersegmental separation between the pair of adjacent ring segments may, for example, comprise joining a spacing element between the pair of adjacent ring segments. The spacing element may be configured to substantially inhibit relative movement of the adjacent ring segments.

In an example, joining the spacing element between the pair of adjacent ring segments may comprise welding the spacing element to the adjacent ring segments. For example, opposing ends of the spacing element may be welded to respective ones of the pair of adjacent ring segments. In another example, the spacing element may be joined between the pair of adjacent ring segments by bolts or other fasteners.

In an example, the method may further comprise removing the coupling means from between the pair of adjacent ring segments after the intersegmental separation between the pair of adjacent ring segments has been fixed. In this manner, the coupling means may be recyclable, for example for use in the further reinforcement the tubular wind turbine structure or for use in the reinforcement of another tubular wind turbine structure.

Adjusting the intersegmental separation between the pair of adjacent ring segments may, for example, comprise forcing the pair of adjacent ring segments radially outward to engage the inner surface of the tubular wind turbine structure with sufficient radial force to hold the ring stiffener at the reinforcement position.

In an example, the method further comprises assembling the radially adjustable ring stiffener inside the tubular wind turbine structure, wherein assembling the ring stiffener comprises coupling the pair of adjacent ring segments together using the coupling means. Advantageously, the ring segments may therefore be introduced into an interior of the tubular wind turbine structure separately, which may enable their insertion into the tubular wind turbine structure through smaller openings. For example, this may be suitable where the tubular wind turbine structure is to be reinforced in-situ on an assembled wind turbine.

In an example, the ring stiffener may comprise a plurality of ring segments, including the pair of adjacent ring segments, that are coupled together by a set of the coupling means. Each of the coupling means may extend between a respective pair of adjacent ones of the plurality of ring segments and may be configured to permit radial adjustment of the ring stiffener by varying the intersegmental separation between adjacent ends of those ring segments. The method may comprise adjusting the intersegmental separation between one or more pairs (or each pair) of the adjacent ring segments to increase the radius of the ring stiffener; and thereby to engage the inner surface of the tubular wind turbine structure with the radial force that holds the ring stiffener at the reinforcement position.

For example, the plurality of ring stiffeners may consist of three ring segments. The plurality of ring segments may be coupled together end-to-end in a circular arrangement by the set of coupling means. The plurality of ring segments may be of equal (arc) length, which may be produce symmetry and a balanced arrangement of forces for example.

In an example, an outer radius of each of the plurality of ring segments may be greater than, or equal to, a radius of the inner surface of the tubular wind turbine structure at the reinforcement position. In this manner, the plurality of ring segments may be complementary to the inner surface of the tubular wind turbine structure and configured to form an interference fit therewith.

Optionally, the tubular wind turbine structure is selected from at least one of: a tubular section of a tower of the wind turbine; and/or a tubular section of a blade of the wind turbine.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

In the drawings, the same reference numerals are used to denote features that are common across drawings.

SPECIFIC DESCRIPTION

Embodiments of the invention relate to a wind turbine structure and to a method of reinforcing a tubular wind turbine structure using a radially adjustable ring stiffener. It is envisaged that the method may be useful for the purpose of reinforcing a tubular section of a wind turbine tower, and/or a blade of the wind turbine, in order to mitigate an area of structural weakness.

The method is arranged to use the radial adjustability of the ring stiffener advantageously to join the ring stiffener to the tubular section without conventional attachment means, such as welds, adhesives or fasteners. Instead, the method involves arranging the ring stiffener inside the tubular section and increasing the radius of the ring stiffener to the extent that the ring stiffener engages an inner surface of the structure with sufficient radial force to hold the ring stiffener in position For example, the radius of the ring stiffener may be enlarged to the extent that an interference fit forms between the ring stiffener and an inner surface of the wind turbine structure, holding the ring stiffener in position by means of friction.

By virtue of this form of attachment, the ring stiffener may effectively reinforce the cross-section of the wind turbine structure and reduce the buckling length of the structure, which has the effect of increasing its buckling resistance. In this manner, the ring stiffener may be attached so as to mitigate an area of structural weakness, without reducing the fatigue strength of the structure.

Figure 1:
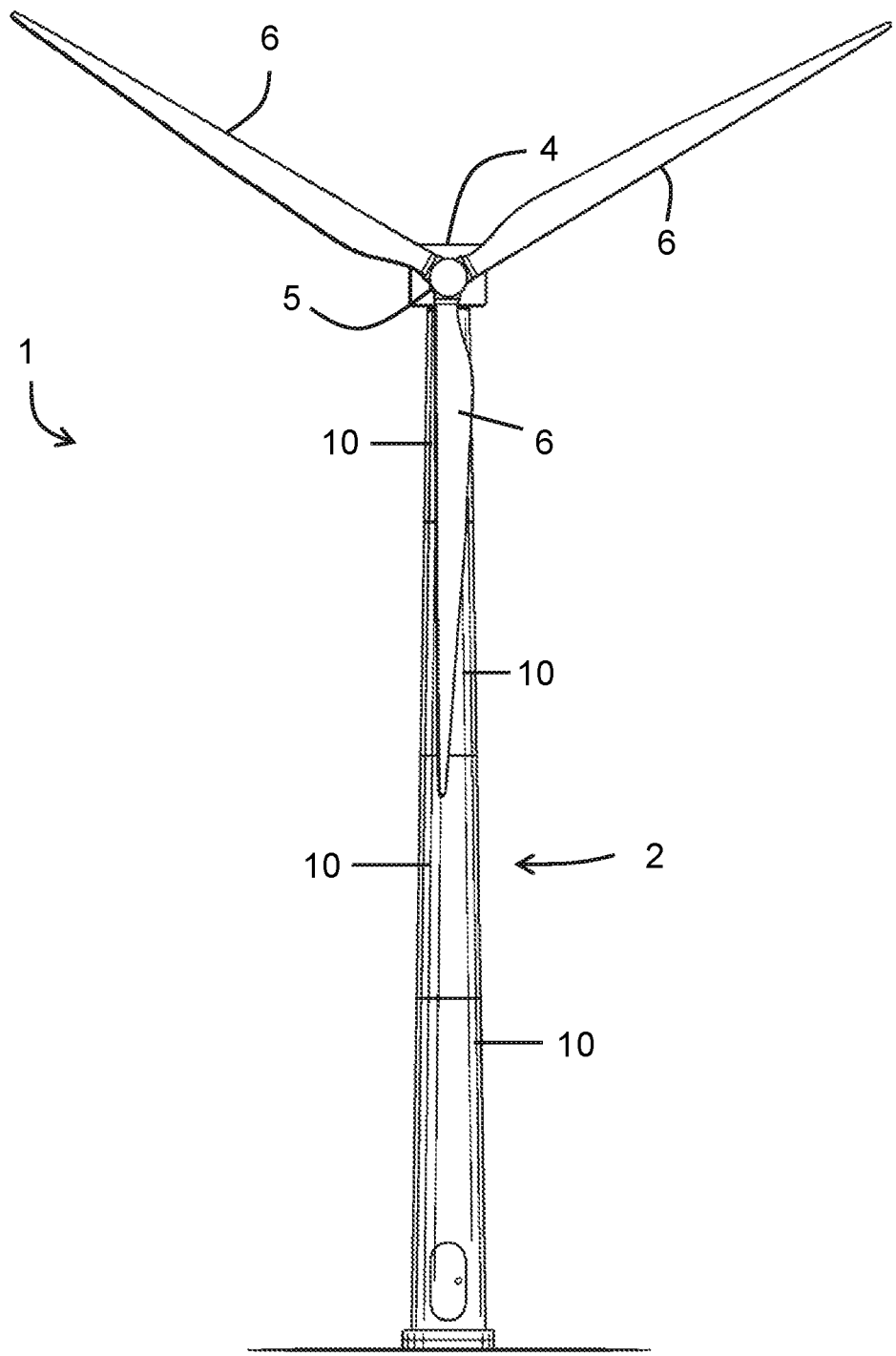
FIG. 1 is a schematic view of an example wind turbine in accordance with an embodiment of the invention.

FIG. 1 shows a horizontal axis wind turbine 1 in accordance with an embodiment of the invention. The wind turbine 1 includes a tower 2, a nacelle 4 and a set of blades 6.

The nacelle 4 is mounted on top of the tower 2 and, in this example, the tower 2 is supported on a foundation in the ground (not shown). The nacelle 4 supports a rotor, including a rotor hub 5, to which the set of blades 6 are attached, and the nacelle 4 houses power generating equipment (not shown) for converting the kinetic energy of the wind into electrical energy.

The tower 2 comprises a plurality of tower sections 10, stacked on top of each other and joined together to form the tower structure. The number of tower sections 10 is not critical to the invention though and, in other examples, the tower 2 may comprise a single tower section 10 and still fall within the scope of the appended claims.

Each tower section 10 is tubular and substantially cylindrical. Although, as shown in FIG. 1, each tower section 10 may be slightly tapered long its length, so as to have a slightly larger diameter at one end than the other end.

The plurality of tower sections 10 may be formed from steel, or concrete, for example. Typically, such tower sections may be around 10 to 30 metres in height, and around 3 to 6 metres in diameter, having a wall thickness of around 10 to 40 millimetres, for context.

Figure 2:
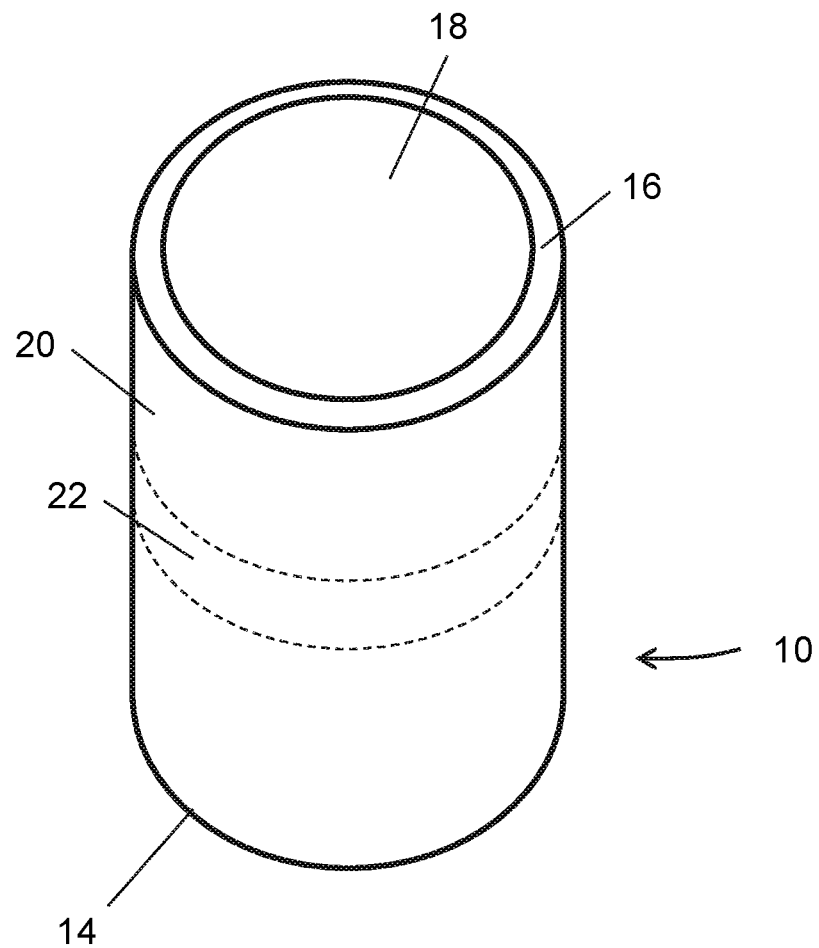
FIG. 2 is a schematic view of an example tower section of the wind turbine shown in FIG. 1.

Turning now to FIG. 2, an illustrative, but somewhat simplified, view of one of the plurality of tower sections 10 is shown. In this example, the tower section 10 comprises a tower wall 12 that is substantially cylindrical and extends along a longitudinal axis of the tower section 10, from a base 14 at one end, to a top 16 at the other end.

An interior of the tower section 10 is defined by an inner surface 18 of the tower wall 12 and an exterior of the tower section 10 is defined by an outer surface 20 of the tower wall 12. The thickness of the tower wall 12, between the inner surface 18 and the outer surface 20, is substantially constant between the base 14 and the top 16, despite the inward taper.

Although not shown in FIG. 2 to avoid obscuring the present invention, the skilled person would appreciate that the tower section 10 may further comprise other components that are not described here, including access ladders, cable support brackets, and floor joists that are conventional in the art.

The skilled person would appreciate that the strength of the tower section 10 is largely derived from the thickness of the tower wall 12. Hence, a lighter tower section 10, with a thinner tower wall 12, will inherently be more flexible. This means that a thin-walled tower section 10 may be more susceptible to structural weaknesses, such as buckling, which may occur if the compressive load on one side of the tower section 10 becomes too large, causing structural instability.

Hence, if the tower wall 12 is too thin, as may be the case on a vulnerable section of the tower 2, the compressive load during an extreme transient event may be large enough to cause the compressed side of the tower section 10 to buckle and move away from its equilibrium position. After buckling, the structural integrity of the tower section 10, and the tower 2 itself, may be compromised.

The method of the present invention attempts to mitigate this problem by installing a radially adjustable ring stiffener to reinforce the tower section 10 and increase the strength of the tower 2.

For example, the radially adjustable ring stiffener may be installed at a reinforcement position, shown generally as 22, that is identified as being a transverse area of structural weakness within the tower 2, and/or the tower section 10 itself. The area of structural weakness may be identified by a structural integrity assessment, for example, that may identify potential load limiting locations. The position of the area of structural weakness may depend on the design of the tower 2 and the respective loads applied to the tower section 10 and may be identified based on a maximum anticipated load during a transient event, for example. In this example, the reinforcement position 22 may be arranged at mid-height of the tower section 10, with the tower section 10 being relatively stiff near the base 14 and the top 16.

Once installed, the adjustable ring stiffener acts to enlarge the cross-section of the tower section 10 at the reinforcement position 22, effectively increasing the thickness of the tower wall 12. The increased wall thickness increases the strength of the tower section 10 and mitigates any structural weakness that could otherwise lead to buckling.

Figure 3A:
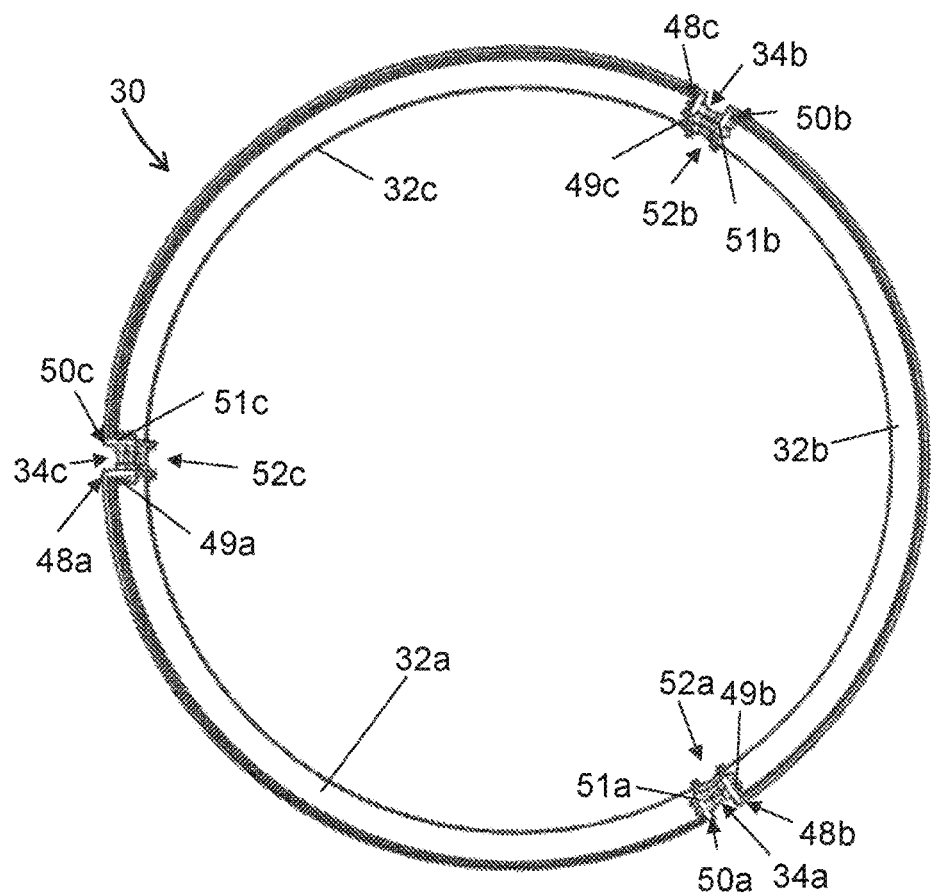
FIG. 3A is a schematic view of an example radially adjustable ring stiffener in accordance with an embodiment of the invention.
Figure 3B:
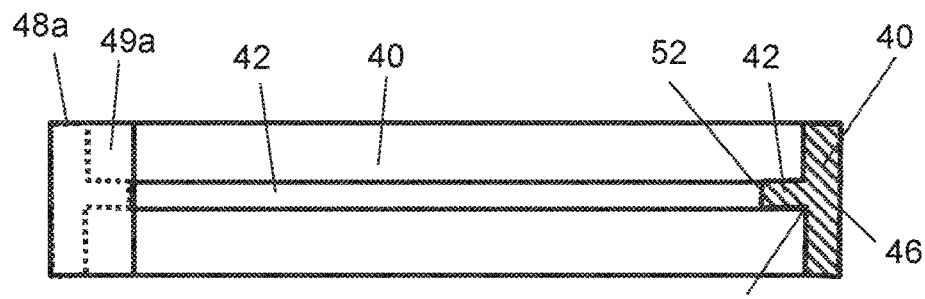
FIG. 3B is a side view of an example ring segment of a plurality of ring segments of the radially adjustable ring stiffener shown in FIG. 3A.

FIGS. 3A and 3B show an example of a radially adjustable ring stiffener 30 in accordance with an embodiment of the invention.

FIG. 3A shows a plan view of the ring stiffener 30, which includes a plurality of ring segments 32*a-c* and a set of coupling means 34*a-c*. Each of the plurality of ring segments 32*a-c* takes the form of an arcuate length of a ring and the plurality of ring segments 32*a-c* are coupled together, end-to-end, by the set of coupling means 34*a-c* to form a circular shape.

In this example, the plurality of ring segments 32*a-c* includes a first ring segment 32*a*, a second ring segment 32*b*, and a third ring segment 32*c*. However, it shall be appreciated that, in other examples, the plurality of ring segments may include two or more ring segments.

Additionally, in this example, the first, second and third ring segments 32*a-c* are of equal (arc) length, so as to produce a balanced and symmetric arrangement. However, in other examples, it is not essential that the plurality of ring segments are of equal length.

FIG. 3B shows a side view of an example ring segment, such as the first ring segment 32*a*, which has a T-shaped cross-section in this example (shown by the cross-hatching in FIG. 3B). The T-shaped cross-section is not essential to the invention and, in other examples, the particular shape of each ring segment may take other suitable forms for reinforcing the tubular wind turbine structure, featuring an L-shaped, I-shaped, or box-shaped cross-section, for example.

The T-shaped cross-section is defined by a first wall 40 and a transverse second wall 42. The first wall 40 is configured to engage an inner surface of a tubular wind turbine structure, such as the tower section 10, and extends substantially vertically, like a flange, above and below an outer edge 44 of the second wall 42. The second wall 42 protrudes radially inward from the first wall 40, like a web, and acts to increase the radial strength of the ring segment 32*a*.

In this example, an outer surface 46 of the first wall 40 defines an outer surface of the ring segment 32*a* and so it shall be appreciated that the outer surface 46 of the first wall 40 may be configured to engage the tubular wind turbine structure. For example, the outer surface 46 of the first wall 40 may be shaped in a complementary manner to the inner surface 18 of the tower section 10, at the desired reinforcement position 22.

More specifically, the outer surface 46 of the first wall 40 may have a radius that is greater than, or equal to, the radius of the inner surface 18 of the tower wall 12 (e.g. at the reinforcement position 12), and is therefore complementary thereto.

As shown in FIGS. 3A and 3B, each ring segment 32*a-c* extends from a respective first end 48*a-c* to a respective second end 50*a-c* and the ring segments 32*a-c* are joined together end-to-end to form the ring stiffener 30.

To support the coupling together of adjacent ring segments 32*a-c*, each ring segment 32*a-c* includes a first end wall 49*a-c*, at the first end 48*a-c*, and a second end wall 51*a-c*, at the second end 50*a-c*, in this example.

The first and second end walls 49*a-c*, 51*a-c*, of each ring segment 32*a-c* are substantially rectangular and extend substantially vertically, from an inner radius of each ring segment 32*a-c*, defined at an inner edge 52 of the second wall 42, to an outer radius of that ring segment 32*a-c*, defined at the outer surface 46 of the first wall 40.

Once assembled, it shall be appreciated that adjacent ones of the first and second end walls 49*a-c*, 51*a-c* of adjacent ring segments 32*a-c* form pairs of opposing walls 52*a-c*, as shown in FIG. 3A. For example, a first pair of opposing walls 52*a* forms between the second end wall 51*a* of the first ring segment 32*a* and the first end wall 49*a* of the second ring segment 32*b*; a second pair of opposing walls 52*b* forms between the second end wall 51*b* of the second ring segment 32*b* and the first end wall 49*c* of the third ring segment 32*c*; and a third pair of opposing walls 52*c* forms between the second end wall 51*c* of the third ring segment 32*c* and the first end wall 49*a* of the first ring segment 32*a*.

The pairs of opposing walls 52*a-c* may be suitable for coupling the adjacent ring segments 32*a-c* together using the set of coupling means 34*a-c*, as shall become clear.

Considering the set of coupling means 34*a-c* in more detail, each coupling means 34*a-c* is configured to couple a respective pair of adjacent ring segments 32*a-c* together and to permit radial adjustment of the ring stiffener 30 by varying a separation between adjacent ends of those ring segments 32*a-c*. Herein, the separation between adjacent ends of adjacent ring segments 32*a-c* shall be referred to as the 'intersegmental separation'.

For this purpose, each coupling means 34*a-c* may be conveniently arranged between, and coupled to, a respective one of the pairs of opposing walls 52*a-c*, for example.

Figure 4A:
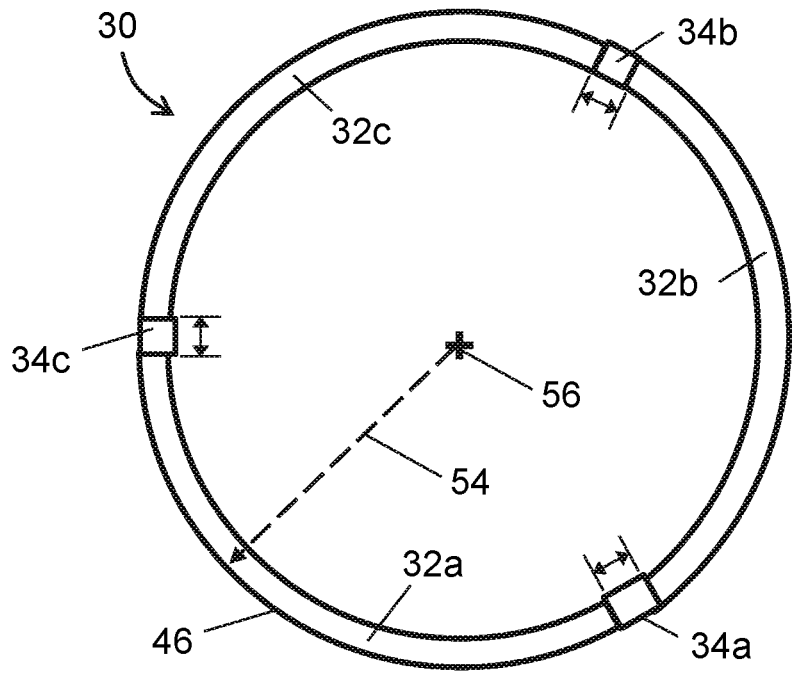
FIGS. 4A and 4B illustrate the radially adjustable ring stiffener, shown in FIG. 3A, configured in a first state and a second state respectively.
Figure 4B:
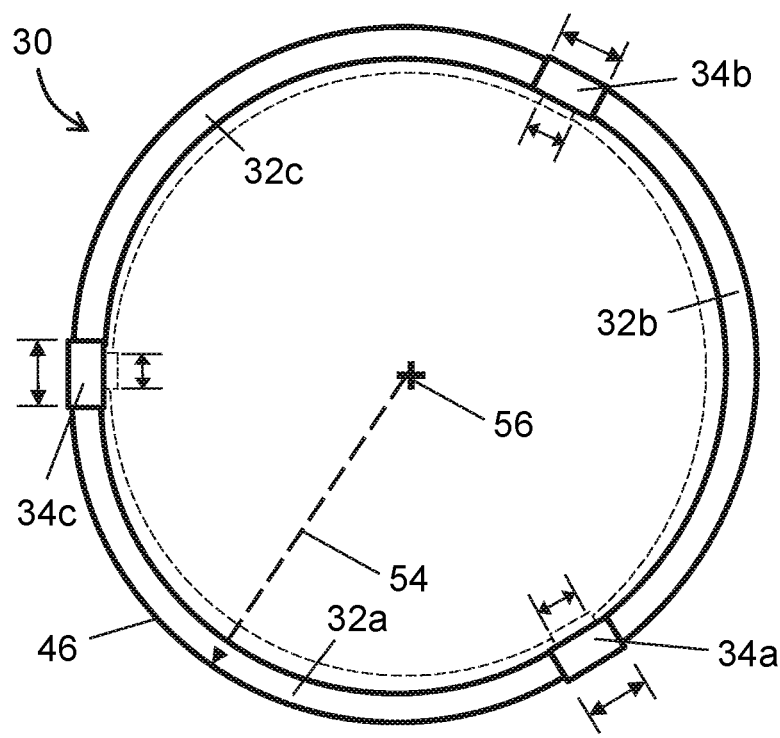

FIGS. 4A and 4B are provided to illustrate the radial adjustment of the ring stiffener 30 in more detail.

FIG. 4A shows the ring stiffener 30 configured in a first state and FIG. 4B shows the ring stiffener 30 configured in a second state, with the ring stiffener 30 also illustrated in the first state in dashed lines. In FIGS. 4A and 4B, an outer radius 54 of the ring stiffener 30 is depicted and is shown to extend from a centre 56 of the ring stiffener 30 to an outer surface of one of the plurality of ring segments 32*a-c*, such as the outer surface 46 of the first ring segment 32*a*.

Comparing FIGS. 4A and 4B, it is evident that the outer radius 54 of the ring stiffener 30 is shorter in the first state than the second state. For example, in the second state, the outer radius 54 of the ring stiffener 30 may increase by at least 3% compared to the first state, and may increase by at least 5% compared to the first state in other examples.

Hence, in the first state, the ring stiffener 30 can be passed through a hole, or aperture, having a smaller diameter, than is possible in the second state.

As shall become clear, during the installation process, the radius of the ring stiffener 30 may therefore be advantageously reduced to move the ring stiffener 30 to the reinforcement position.

Between the first state and the second state, the ring stiffener 30 is configured to expand radially outward and, it is evident that, between each pair of adjacent ring segments 32*a-c*, the intersegmental separation increases from a first length to a second length, as shown by comparing FIGS. 4A and 4B.

For the sake of clarity, it shall be appreciated that the plurality of ring segments 32*a-c* remain substantially unchanged between the first state and the second state. However, the coupling means 34*a-c* allow the intersegmental separations to increase between each pair of adjacent ring segments 32*a-c*. This has the effect of increasing the circumference of the ring stiffener 30 and, in turn, pushing the plurality of ring segments 32*a-c* radially outward, expanding the ring stiffener 30.

As shall become clear, within the scope of the appended claims, the coupling means 34*a-c* may take various forms for coupling the adjacent ring segments 32*a-c* together as the intersegmental separations are varied.

In an example, the coupling means 34*a-c* may be configured to allow variation of the intersegmental separation passively, whilst coupling the adjacent ring segments 32*a-c* together. For example, the coupling means 34*a-c* may take the form of a flexible coupling device, or mechanism, that may be configured to constrain the relative movement of adjacent ring segments 32*a-c*, and thereby allow the intersegmental separation to be varied by other means that force the adjacent ring segments 32*a-c* radially outward.

In another example, the coupling means 34*a-c* may additionally, or alternatively, comprise a biasing means configured to urge the adjacent ring segments 32*a-c* apart. Hence, radially inward force may be required to compress the biasing means and maintain the ring stiffener 30 in the first state. Upon removal of the radially inward force, the biasing means may urge the adjacent ring segments 32*a-c* apart to expand the ring stiffener 30 to the second state. It shall be appreciated that the biasing means may simultaneously act to couple the adjacent ring segments 32*a-c* together, preventing their detachment from one another.

In another example, the coupling means 34*a-c* may additionally, or alternatively, be adjustable and configured to set, hold, or otherwise control, the intersegmental separation between the adjacent ring segments 32*a-c*. For example, such adjustable coupling means may take the form of an adjustable spacing element, or device, that extends between the adjacent ring segments 32*a-c*, holding the adjacent ends of those ring segments 32*a-c* apart.

In yet another example, the coupling means 34*a-c* may additionally, or alternatively, comprise means for actively varying the intersegmental separation between one or more of the pairs of adjacent ring segments 32*a-c*. For example, the coupling means may include an actuator, or actuation means, that may be operated to urge the adjacent ring segments 32*a-c* apart and vary the intersegmental separation. Such actuation means may include any of a mechanical, hydraulic, electric or pneumatic actuator, for example.

Figure 5:
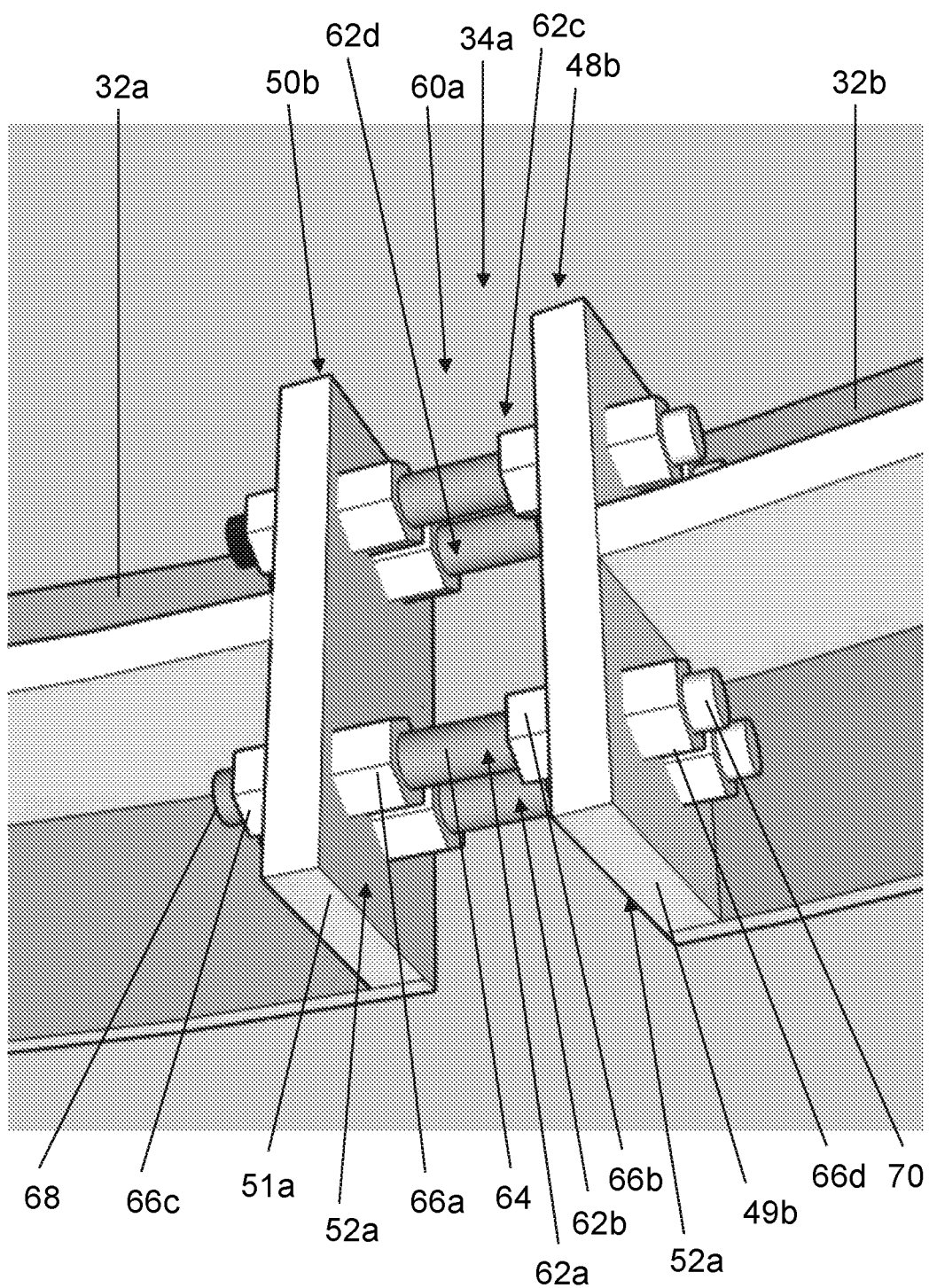
FIG. 5 illustrates an example coupling means arranged between an adjacent pair of the plurality of ring segments of the radially adjustable ring stiffener, shown in FIG. 3A.

To give a detailed example, FIG. 5 shows a portion of an example ring stiffener 30 featuring a set of coupling means 34*a-c* that are operable to vary the intersegmental separation between one or more of the pairs of adjacent ring segments 32*a-c*.

For the sake of simplicity, FIG. 5 only shows the coupling means 34*a* arranged between the first and second ring segments 32*a*, 32*b*, but it shall be appreciated that the other coupling means 34*b*, 34*c* in the set of coupling means 32*a-c* may be substantially identical.

In this example, the coupling means 34*a* takes the form of a fastening arrangement 60*a* arranged between the pair of opposing walls 52*a* at adjacent ends of the first and second adjacent ring segments 32*a*, 32*b*. As shall become clear, the fastening arrangement 60*a* may be selectively operated as a leadscrew mechanism to urge the pair of adjacent ring segments 32*a*, 32*b* apart.

In this example, the fastening arrangement 60*a* comprises four substantially identical sub-arrangements 62*a-d*. These sub-arrangements 62*a-d* are functionally equivalent and, in other examples, any one of those sub-arrangements 62*a-d* may be operated sufficiently as the coupling means 34*a*.

Considering one of the sub-arrangements 62*a-d* in more detail, the sub-arrangement 62*a* includes a threaded rod 64 and a complementary set of fastening elements 66*a-d*.

The threaded rod 64 extends from a first end 68 to a second end 70 and passes through a complementary pair of holes (not shown) formed in the pair of opposing walls 52*a*.

The set of fastening elements 66*a-d* are mounted on the threaded rod 64 so as to bear against the pair of opposing walls 52*a* at the adjacent ends of the first and second ring segments 32*a*, 32*b* and thereby to control the intersegmental separation between them.

For this purpose, the set of fastening elements 66*a-d* includes a first fastening element 66*a*, a second fastening element 66*b*, a third fastening element 66*c*, and a fourth fastening element 66*d*, in this example.

The first and second fastening elements 66*a*, 66*b* are mounted on the threaded rod 64 between, and in abutment against, the pair of opposing walls 52*a*, holding the adjacent ring segments 32*a*, 32*b* apart. For example, the first fastening element 66*a* may be arranged to bear against the second end wall 51*a* of the first segment 32*a* and the second fastening element 66*b* may be arranged to bear against the opposing first end wall 49*b* of the second ring segment 32*b*.

With this configuration, it shall be appreciated that the fastening arrangement 60*a* may be operated as a leadscrew mechanism capable of varying the intersegmental separation between the first and second ring segments 32*a*, 32*b*.

In particular, the ring stiffener 30 may be adjusted from the first state, shown in FIG. 4A, to the second state, shown in FIG. 4B, by turning at least one of the first and second fastening elements 66*a*, 66*b* along the threaded rod 64 so as to increase a distance between the first and second fastening elements 66*a*, 66*b*.

As the distance between the first and second fastening elements 66*a*, 66*b* increases, the pair of adjacent ring segments 32*a*, 32*b* are urged further apart increasing the intersegmental separation therebetween.

The third and fourth fastening elements 66*c*, 66*d* may be mounted on the first and second ends 68, 70 of the threaded rod 64, with the pair of opposing walls 52*a* arranged therebetween, so as to ensure that the first and second ring segments 32*a*, 32*b* are adequately coupled together.

For example, the third fastening element 66*c* may be turned so as to bear against the second end wall 51*a* of the first segment 32*a* and thereby to clamp the second end wall 51*a* against the first fastening element 66*a*. Similarly, the fourth fastening element 66*d* may be turned so as to bear against the first end wall 49*b* of the second segment 32*b* and thereby to clamp the first end wall 49*b* against the second fastening element 66*b*.

This arrangement may serve to substantially inhibit movement of the first and second ring segments 32*a*, 32*b* away from the first and second fastening elements 66*a*, 66*b*. Without the third and fourth fastening elements 66*c*, 66*d*, the first and second ring segments 32a, 32b may become uncoupled during transportation or installation, for example.

It shall also be appreciated that the ring stiffener 30 may be returned to the first state, shown in FIG. 4A, by operating the fastening arrangement 60a so as to reduce the distance between the first and second fastening elements 66a, 66b.

A method 100 of reinforcing a tubular wind turbine structure using a radially adjustable ring stiffener in accordance with an embodiment of the invention shall now be described with reference to FIGS. 6 to 9.

Figure 6:
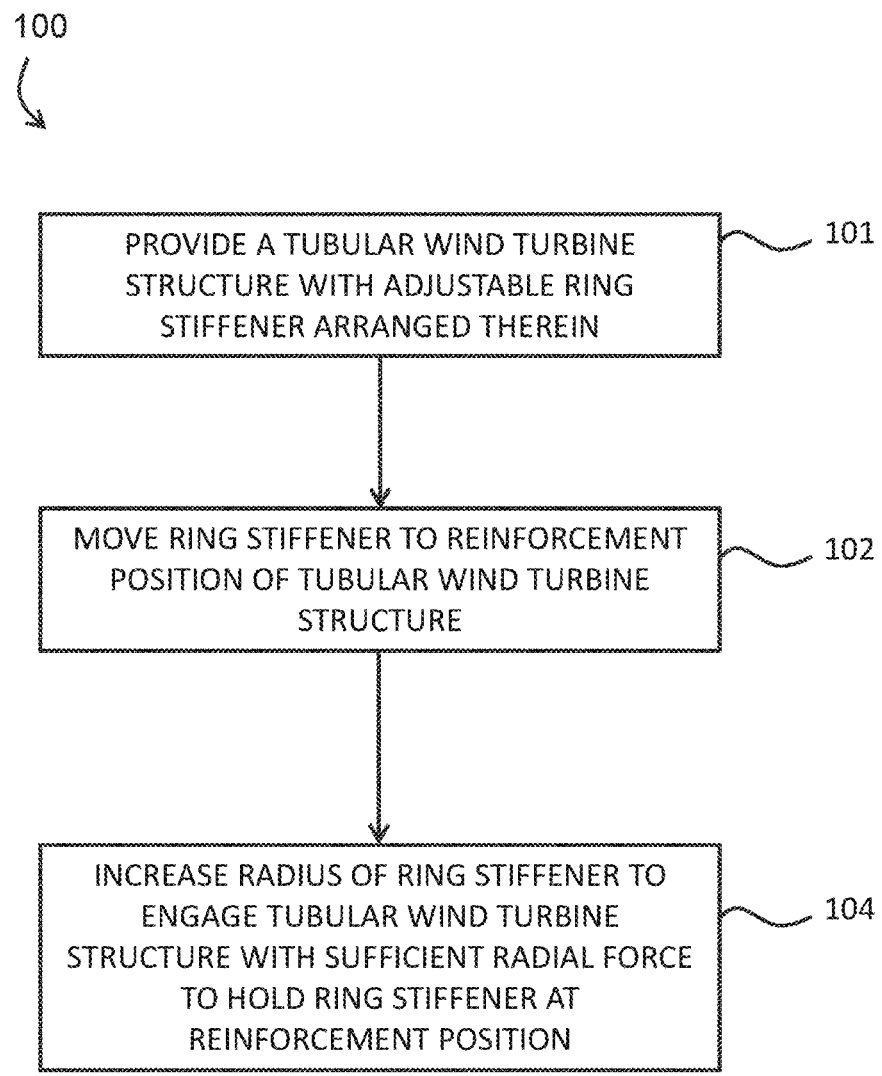
FIG. 6 illustrates an example method, in accordance with an embodiment of the invention, of reinforcing a tubular wind turbine structure, such as the tower section shown in FIG. 2, using a radially adjustable ring stiffener, such as the radially adjustable ring stiffener shown in FIG. 3A.
Figure 7:
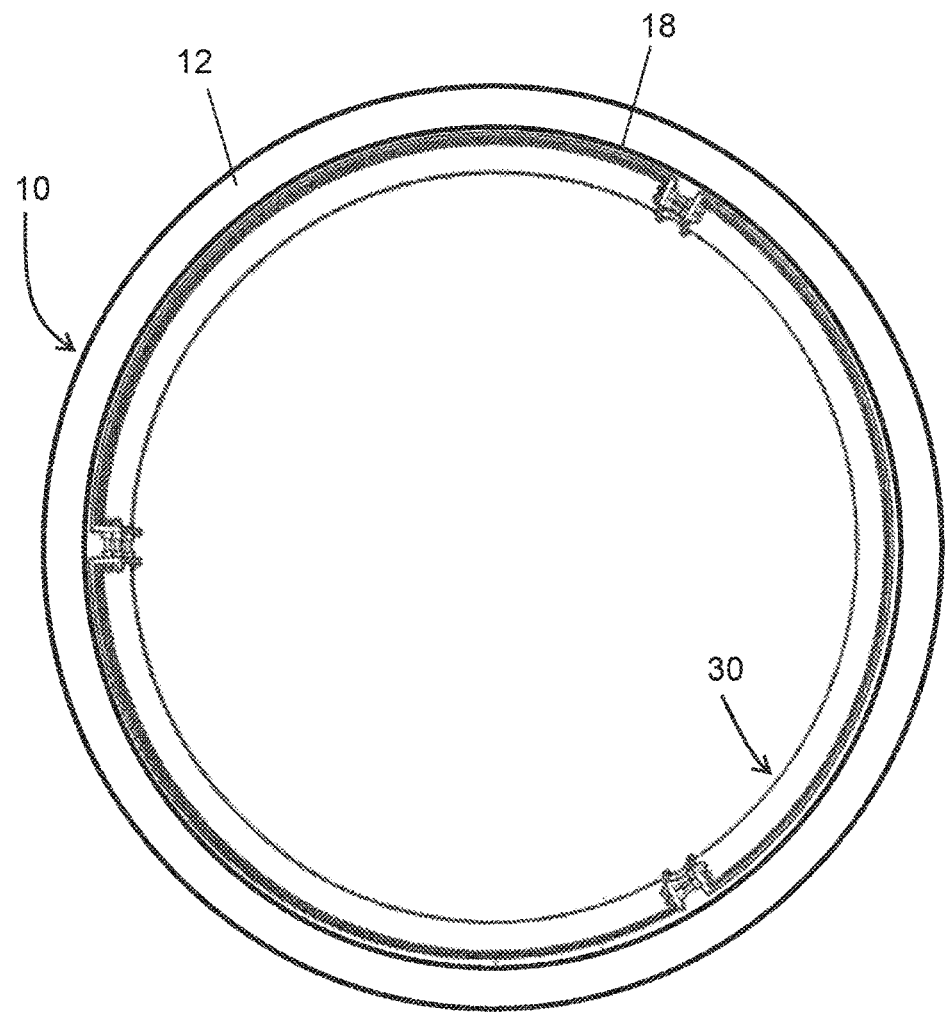
FIG. 7 illustrates a step of the method, shown in FIG. 6, of moving the radially adjustable ring stiffener, shown in FIG. 3A, into position inside the tower section, shown in FIG. 2.
Figure 8:
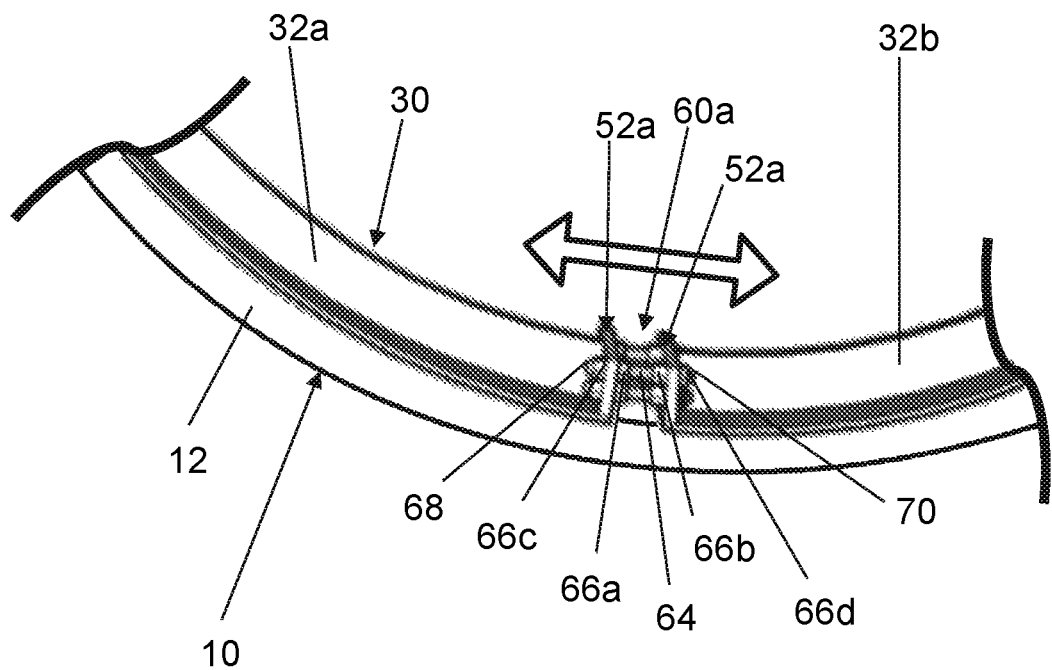
FIG. 8 illustrates another step of the method, shown in FIG. 6, of increasing the radius of the radially adjustable ring stiffener, shown in FIG. 3A, inside the tower section, shown in FIG. 2.
Figure 9:
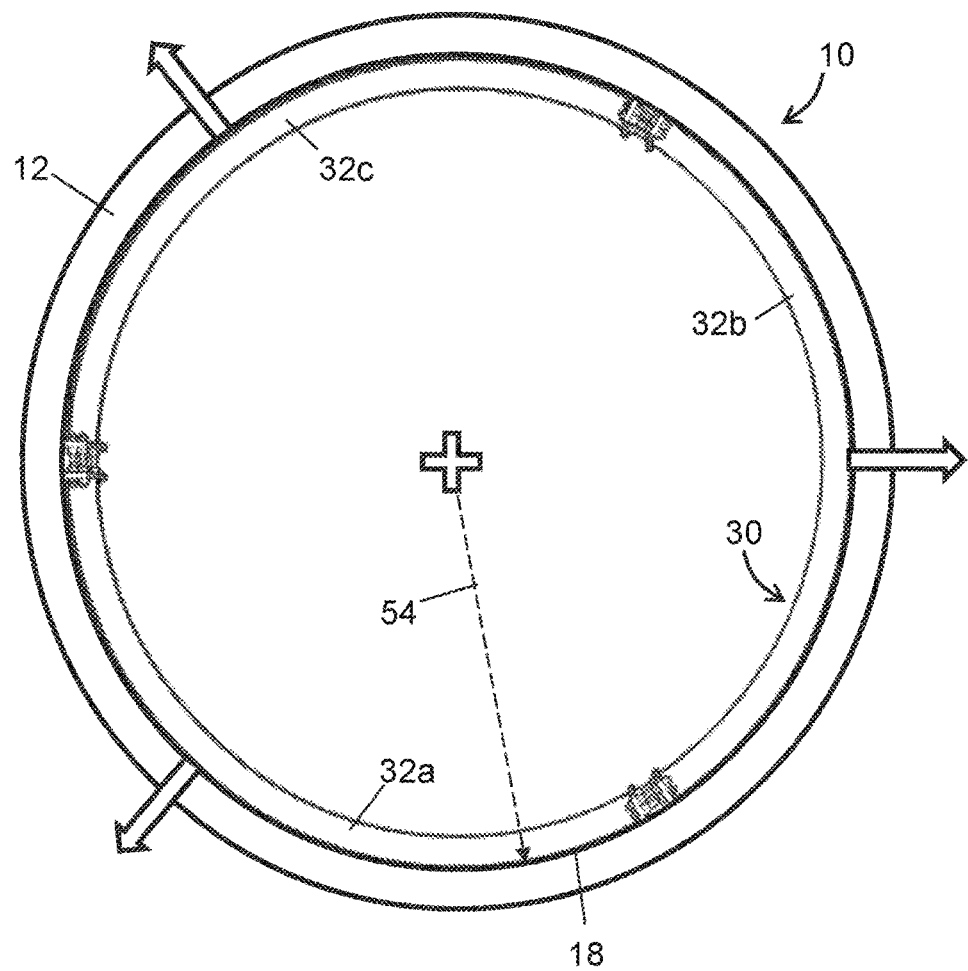
FIG. 9 illustrates the radially adjustable ring stiffener, shown in FIG. 3A, attached to the tower section, shown in FIG. 2.

FIG. 6 shows a schematic illustration of the method 100 and FIGS. 7 to 9 are provided to illustrate one or more steps of the method.

For the sake of simplicity, the following example concerns a method of reinforcing the tower section 10, shown in FIG. 2, using the radially adjustable ring stiffener 30, shown in FIG. 5.

The tower section 10 is to be reinforced prior to assembly of the tower 2, for example whilst at a manufacturing facility, and, in step 101, the radially adjustable ring stiffener is situated inside the tower section 10 ready for installation.

In step 102, the ring stiffener 30 is moved to the reinforcement position 22 of the tower section 10 ready for attachment to the tower wall 12. In other words, the ring stiffener 30 may be moved, in step 102, along the longitudinal axis of the tower section 10 to the area that requires reinforcement.

For this purpose, the ring stiffener 30 may be arranged in the first state, shown in FIG. 4A, and positioned coaxially with respect to the tower section 10.

It shall be appreciated that, in the first state, the ring stiffener 30 may be dimensioned so as to fit inside the tower section 10 with some clearance between the outer surface 46 of each ring segment 32a-c and the inner surface of the tower wall 12.

For example, FIG. 7 shows a plan view of the ring stiffener 30 arranged at the reinforcement position 22.

By virtue of such clearance, the ring stiffener 30 may be moved along the longitudinal axis of the tower section 10, between the base 14 of the tower section 10 and the reinforcement position 22, substantially uninhibited.

Although not described in detail here, the skilled person shall appreciate that the ring stiffener 30 may be moved to the reinforcement position 22 by various means, including a suitable lifting mechanism, or machine, such as a crane.

In this example, the ring stiffener 30 is designed so as to completely avoid contact with the tower wall 12 whilst arranged in the first state. However, in other examples, it shall be appreciated that the ring stiffener 30 may lightly engage the inner surface 18 of the tower wall 12 at the reinforcement position 22, but the force of engagement may be insufficient to hold the ring stiffener 30 in position.

Returning to FIG. 6, in order to adequately join the ring stiffener 30 to the tower section 10, the radius of the ring stiffener 30 may be increased, in step 104, so as to engage the inner surface 18 of the tower wall 12 with sufficient radial force to hold the ring stiffener 30 in position.

For this purpose, it is necessary to increase the intersegmental separation between one or more of the pairs of adjacent ring segments 32a-c. Hence, for sufficient engagement, the ring stiffener 30 may be adjusted from the first state, shown in FIG. 4A, to the second state, shown in FIG. 4B.

In this example, the radius of the ring stiffener 30 may be increased in this manner by operating the adjustable coupling means 34a-c so as to urge one or more of the pairs of adjacent ring segments 32a-c apart.

By way of example, FIG. 8 illustrates the increase of the intersegmental separation between the first and second ring segments 32a, 32b.

As shown in FIG. 8, the adjustable coupling means 34a takes the form of the fastening arrangement 60a (described previously), in this example, and may be operated as a leadscrew mechanism, in step 104, to urge the pair of adjacent ring segments 32a, 32b apart.

In particular, considering the operation of the first sub-arrangement 62a of the fastening arrangement 60a in more detail.

In step 104, the first and second fastening elements 66a, 66b may be turned along the threaded rod 64 so as to increase the distance, or separation, between them.

As the distance between the first and second fastening elements 66a, 66b increases, the pair of adjacent ring segments 32a, 32b are urged apart and radially outward, so as to engage the tower wall 12.

As the ring stiffener 30 continues to expand from the first state to the second state, the plurality of ring segments 32a-c may be forced against the tower wall 12 with increasing radial force, strengthening the engagement between the ring stiffener 30 and the tower section 10.

Eventually, the outer radius 54 or the ring stiffener 30 may increase to the extent that it is greater than, or equal to, the radius of the inner surface 18 of the tower wall 12. Hence, an interference fit may be formed between the ring stiffener 30 and the tower section 10, as shown in FIG. 9.

It shall be appreciated that the tower wall 12 will act to resist the expansion of the ring stiffener 30, as the ring stiffener 30 expands from the first state to the second state. Hence, the torque required to turn the first and second fastening elements 66a, 66b along the threaded rod 64 may correspond to a respective radial force needed to hold the ring stiffener 30 at the reinforcement position 22.

Once the ring stiffener 30 has been suitably expanded, the third and fourth fastening elements 66c, 66d may be turned along the threaded rod 64, towards the first and second fastening elements 66a, 66b, so as to clamp the pair of opposing walls 52a and fix the intersegmental separation between the adjacent ring segments 32a-c.

Thereafter, the ring stiffener 30 may be effectively joined to the tower section 10 by means of friction alone, requiring no additional support, welds, or other fastenings, between the ring stiffener 30 and the tower wall 12.

It shall be appreciated that the expansion of the ring stiffener 30 may be carried out by increasing the intersegmental separations between one or more of the pair of adjacent ring segments 32a-c, simultaneously or one after the other.

Advantageously, the attached ring stiffener 30 effectively enlarges the wall thickness of the tower wall 12 at the reinforcement position 22, mitigating the structural weakness of the tower section 10, without reducing its fatigue resistance.

Additionally, if desired, the ring stiffener 30 may be selectively disengaged from the tower wall 12, by repeating the above steps in reverse order and reducing the radius of the ring stiffener 30 from the second state to the first state.

It will also be appreciated by the skilled person that the invention may relate to the reinforcement of other tubular wind turbine structures, such as a tubular section of a turbine blade 6, which may, for example, be in-situ (in the assembled wind turbine structure).

In another example, the method 100 of reinforcing the tubular wind turbine structure may further include a step of securing the engagement between the ring stiffener 30 and the tubular wind turbine structure by fixing the intersegmental separation between one or more of the pair of adjacent ring segments 32a-c, after the ring stiffener 30 has been expanded to the second state.

For example, the intersegmental separation between each pair of adjacent ring segments 32a-c may be secured by joining a respective spacing element between the pair of adjacent ring segments 32a-c. Once joined, the spacing element may be configured to substantially inhibit relative movement of the adjacent ring segments 32a-c.

Figure 10:
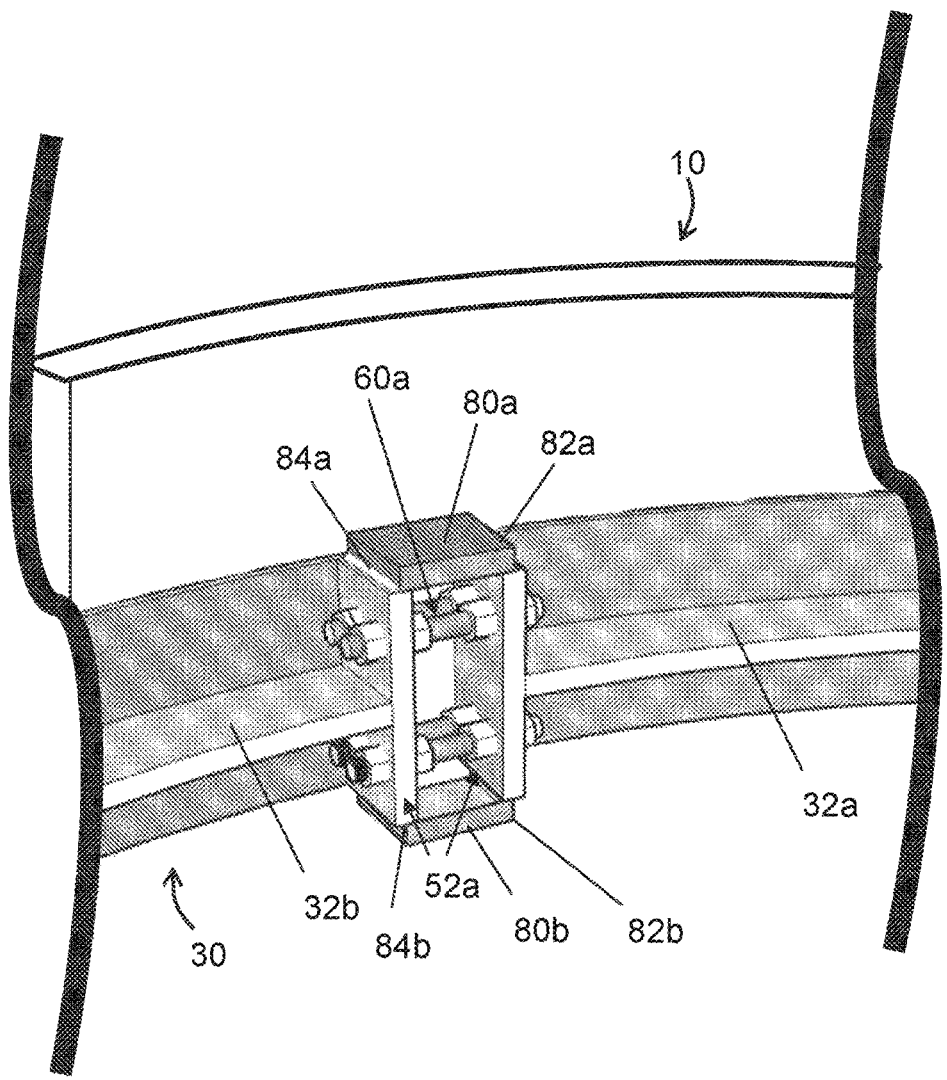
FIG. 10 illustrates a step of fixing the distance between the plurality of ring segments of the radially adjustable ring stiffener, shown in FIG. 3A, once attached to the tower section, shown in FIG. 2.

As shown in FIG. 10, after the ring stiffener 30 has been expanded so as to engage the tower section 10 with sufficient radial force to remain in position, in step 104, a first spacing element 80a and a second spacing element 80b may be joined between the first and second ring segments 32a, 32b.

In particular, in this example, the first and second spacing elements 80a,b take the form of respective first and second elongate struts, each extending from a respective first end 82a,b to a respective second end 84a,b.

The first end 82a,b of each spacing element 80a,b is joined to the first ring segment 32a and the second end 84a,b of each spacing element 80a,b is joined to the second ring segment 32b. In particular, in this example, the first spacing element 80a is joined between the first and second ring segments 32a,b with each end 82a, 84a being welded to a respective one of the pair of opposing walls 52a arranged at the adjacent ends of those ring segments 32a, 32b. Similarly, the second spacing element 80b is also joined between the first and second ring segments 32a,b with each end 82b, 84b being welded to a respective one of the pair of opposing walls 52a. Hence, the first spacing element 80a may be welded to upper surfaces of the pair of opposing walls 52a and the second spacing element 80b may be welded to lower surfaces of the pair of opposing walls 52a, as shown in FIG. 10.

In this example, it shall be appreciated that the welds are applied to the ring stiffener 30, and not to the surface of the tower wall 12, thereby mitigating the formation of any hotspots on the tower wall 12.

In other examples, the intersegmental separations between the adjacent ring segments 32a-c may be secured by other means, such as bolted intermediate spacing elements.

In another example, the method 100 of reinforcing the tubular wind turbine structure may further include a step of removing the coupling means 34a-c from the ring stiffener 30 after the intersegmental separations are secured. By way of example, once the spacing elements 80a,b have been fitted between the first and second adjacent ring segments 32a,b, the fastening arrangement 60a may be unfastened, so as to remove the threaded rod 64 and the set of fastening element 66a-d, and the spacing elements 80a,b may maintain the intersegmental separation.

Advantageously, the coupling means 34a-c may then be reused elsewhere, for example in coupling the ring segments of another radially adjustable ring stiffener together.

In another example, the method 100 of reinforcing a tubular wind turbine structure may further include a step of moving the radially adjustable ring stiffener 30 into the tower section 10, prior to step 101, and before moving the ring stiffener 30 to the reinforcement position, in step 102.

For example, the ring stiffener 30 may be adjusted so as to reduce the radius of the ring stiffener 30 to the first state and, thereafter the ring stiffener 30 may be introduced into the tower section 10 through an opening at the base 14 or the top 16 of the tower section 10.

Alternatively, the fact that the ring stiffener 30 is an assembly of parts may be used advantageously, and the ring stiffener 30 may be introduced to the interior volume of the tower section 10 in un-assembled form. For example, each of the plurality of ring segments 32a-c may be individually introduced into the tower section 10 and subsequently assembled together, inside the tower section 10, by coupling the plurality of ring segments 32a-c together end-to-end using the set of coupling means 32-c.

Advantageously, in this manner, the ring stiffener 30 can be introduced through smaller apertures and subsequently assembled inside the tubular wind turbine structure. This may facilitate the in-situ installation of the ring stiffener 30 to a tubular wind turbine structure of an assembled wind turbine 1. It shall be appreciated that, once the wind turbine 1 has been assembled, conventional ring stiffeners often can't be moved into the interior volume of the tower 2 and, instead, conventional ring stiffeners must be fitted to the external surfaces of the tower 1.

As mentioned previously, the coupling means 34a-c between the adjacent ring segments 32a-c of the ring stiffener 30 may take various forms that are configured to couple the adjacent ring segments 32a-c together whilst the intersegmental separations are varied. The following examples are provided to demonstrate examples of implementing the method 100 where the ring stiffener 30 includes other such coupling means 34a-c.

Accordingly, in an example, the coupling means 34a-c may take the form of the flexible coupling device, or mechanism, described previously, which is configured to passively allow variation of the intersegmental separation, whilst coupling the adjacent ring segments 32a-c together.

In which case, a tubular wind turbine structure may be reinforced substantially as described in the method 100 described previously.

However, in order to increase the radius of the ring stiffener 30, in step 104, the method may comprise applying radially outward force to the plurality of ring segments 32a-c.

For example, one or more actuators may be coupled to the plurality of ring segments 32a-c and the one or more actuators may be operated to urge the plurality of ring segments 32a-c apart and radially outward. Upon application of the radially outward force, the coupling means 34a-c may allow the intersegmental separation between one or more of the pairs of adjacent ring segments 32a-c to increase, expanding the ring stiffener 30 from the first state to the second state and engaging the tower wall 12 with sufficient radial force to hold the ring stiffener 30 in position.

In this example, the coupling means 34a-c may permit such expansion, but to maintain the engagement between the ring stiffener 30 and the tower wall 12, it may be necessary for the one or more actuators to maintain the radially outward force, and/or to join one or more spacing elements between the adjacent ring segments 32a-c, as described previously.

In another example, the coupling means 34a-c may additionally, or alternatively, comprise a biasing means, as described previously, configured to couple adjacent ring segments 32a-c together, whilst urging them apart.

Hence, a tubular wind turbine structure may be reinforced substantially as described in the method 100, described previously. However, in steps 101 and 102, the biasing means may be compressed by radially inward forces acting on the plurality of ring segments 32a-c to maintain the ring stiffener 30 in the first state whilst the ring stiffener is moved to the reinforcement position. For example, the ring stiffener 30 may be compressed radially inward by one or more tension cables extending between adjacent ring segments 32*a-c*.

Once the ring stiffener 30 has been moved to the reinforcement position 22, the radially inward force may be removed, in step 104, for example by uncoupling the one or more tension cables. Upon removal of the radially inward force, the biasing means may urge the adjacent ring segments 32*a-c* apart to expand the ring stiffener 30 to the second state and thereby to engage the tower wall 12 with sufficient radial force to hold the ring stiffener 30 in position. The joint between the ring stiffener 30 and the tower section 10 may be maintained thereafter by the biasing force of the coupling means 34*a-c*.

In another example, the coupling means 34*a-c* may additionally, or alternatively, be adjustable and configured to set, hold, or otherwise control, the intersegmental separation between the adjacent ring segments 32*a-c*, as described previously. For example, such adjustable coupling means may take the form of an adjustable spacing element or device that extends between the adjacent ring segments 32*a-c*, holding the adjacent ends apart. For example, the adjustable coupling means may bear against the opposing pair of end walls, holding them apart.

Hence, a tubular wind turbine structure may be reinforced substantially as described in the method 100 described previously. However, in step 104, the method may comprise applying radially outward force to the plurality of ring segments 32*a-c*. For example, one or more actuators may be coupled to the plurality of ring segments 32*a-c* and the one or more actuators may be operated to urge the plurality of ring segments 32*a-c* apart and radially outward.

Upon application of the radially outward force, the adjustable coupling means 34*a-c* may allow the intersegmental separation between one or more of the pairs of adjacent ring segments 32*a-c* to increase, expanding the ring stiffener 30 from the first state to the second state and engaging the tower wall 12 with sufficient radial force to hold the ring stiffener 30 in position.

Thereafter, the adjustable coupling means 34*a-c* may be operated to hold the intersegmental separation and maintain the ring stiffener 30 in the expanded second state in the absence of the radially outward force.

For example, the one or more actuators may be disengaged and removed from the ring stiffener 30 after the adjustable coupling means 34*a-c* has set the intersegmental separation.

In yet another example, the coupling means 34*a-c* may additionally, or alternatively, comprise means (other than those described previously) for actively varying the intersegmental separation between one or more of the pairs of adjacent ring segments 32*a-c*. For example, the coupling means 34*a-c* may include an actuator, or actuation means, that may be arranged between adjacent ends of the adjacent ring segments 32*a-c* and operable to urge the adjacent ring segments 32*a-c* apart. The actuator may be hydraulic, pneumatic or electrically actuated, for example, and may be a linear or rotary actuator, for example.

Hence, a tubular wind turbine structure may be reinforced substantially as described in the method 100 described previously. In step 104, the actuator may therefore be operated (like the leadscrew mechanism described previously) to urge the adjacent ring segments 32*a-c* apart, and engage the tower wall 12 will sufficient radial force to hold the ring stiffener in position.

In another example, the tower section 10 may include a plurality of areas of structural weakness that may be reinforced by respective radially adjustable ring stiffeners 30 according to the methods described above.

The illustrated examples discussed above demonstrate various technical implementations of the inventive concept. However, it will be appreciated by the skilled person that other variations may be made apart from those detailed above and yet still fall within the scope of the appended claims.

The invention claimed is:

1. A method of reinforcing a tubular wind turbine structure using a radially adjustable ring stiffener, the ring stiffener comprising a pair of adjacent ring segments coupled together by a coupling means configured to permit radial adjustment of the ring stiffener by varying an intersegmental separation between adjacent ends of those ring segments, the method comprising:
   positioning the ring stiffener at a reinforcement position within the tubular wind turbine structure;
   adjusting the intersegmental separation between the pair of adjacent ring segments to increase the radius of the ring stiffener; and thereby to engage an inner surface of the tubular wind turbine structure with a radial force that holds the ring stiffener at the reinforcement position by means of friction between the ring stiffener and the tubular wind turbine structure; and
   securing the engagement between the ring stiffener and the tubular wind turbine structure by fixing the intersegmental separation between the pair of adjacent ring segments.

2. The method according to claim 1, wherein the coupling means takes the form of an adjustable coupling means operable to control the intersegmental separation between the pair of adjacent ring segments, and wherein adjusting the intersegmental separation between the pair of adjacent ring segments comprises operating the adjustable coupling means.

3. The method according to claim 2, wherein the adjustable coupling means includes an actuator operable to vary the intersegmental separation between the adjacent ends of the ring segments and wherein adjusting the intersegmental separation between the pair of adjacent ring segments comprises operating the actuator to urge the pair of adjacent ring segments apart.

4. The method according to claim 3, wherein the actuator is one of: a pneumatic actuator; a mechanical actuator; a hydraulic actuator; or an electrical actuator.

5. The method according to claim 3, wherein the actuator is a linear actuator.

6. The method according to claim 5, wherein the linear actuator comprises a leadscrew mechanism connected between the pair of adjacent ring segments, and wherein the leadscrew mechanism is operable to urge the pair of adjacent ring segments apart.

7. The method according to claim 6, wherein the leadscrew mechanism engages a pair of opposing walls at the adjacent ends of the ring segments.

8. The method according to claim 7, wherein the adjustable coupling means takes the form of a fastening arrangement and the leadscrew mechanism is a mechanical actuator comprising: a threaded rod, a first fastening element, and a second fastening element, of the fastening arrangement;
   wherein the first and second fastening elements are mounted on the threaded rod between the pair of opposing walls, with the first fastening element bearing against a first one of the opposing walls and the second fastening element bearing against a second one of the opposing walls; and wherein operating the leadscrew mechanism comprises turning at least one of the first and second fastening elements along the threaded rod to increase a distance between the first and second fastening elements and thereby to the urge the pair of adjacent ring segments apart.

9. The method according to claim 1, wherein fixing the intersegmental separation between the pair of adjacent ring segments comprises joining a spacing element between the pair of adjacent ring segments, the spacing element being configured to substantially inhibit relative movement of the adjacent ring segments.

10. The method according to claim 9, wherein joining the spacing element between the pair of adjacent ring segments comprises welding the spacing element to the adjacent ring segments.

11. The method according to claim 1, further comprising removing the coupling means from between the pair of adjacent ring segments after the intersegmental separation between the pair of adjacent ring segments has been fixed.

12. The method according to claim 1, wherein adjusting the intersegmental separation between the pair of adjacent ring segments comprises forcing the pair of adjacent ring segments radially outward to engage the inner surface of the tubular wind turbine structure with sufficient radial force to hold the ring stiffener at the reinforcement position.

13. The method according to claim 1, further comprising assembling the radially adjustable ring stiffener inside the tubular wind turbine structure, wherein assembling the ring stiffener comprises coupling the pair of adjacent ring segments together using the coupling means.

14. The method according to claim 1, wherein the ring stiffener comprises a plurality of ring segments, including the pair of adjacent ring segments, that are coupled together by a set of the coupling means, each of the coupling means extending between a respective pair of adjacent ones of the plurality of ring segments and being configured to permit radial adjustment of the ring stiffener by varying the intersegmental separation between adjacent ends of those ring segments, and
wherein the method comprises adjusting the intersegmental separation between one or more pairs of the adjacent ring segments to increase the radius of the ring stiffener; and thereby to engage the inner surface of the tubular wind turbine structure with the radial force that holds the ring stiffener at the reinforcement position.

15. The method according to claim 14, wherein the plurality of ring stiffeners consists of three ring segments, and wherein the three ring segments are coupled together end-to-end in a circular arrangement by the set of coupling means.

16. The method according to claim 1, wherein an outer radius of curvature of each of the ring segments is greater than or equal to a radius of curvature of the inner surface of the tubular wind turbine structure at the reinforcement position.

17. The method according to claim 1, wherein the tubular wind turbine structure is selected from at least one of:
a tubular section of a tower of the wind turbine; and/or
a tubular section of a blade of the wind turbine.

18. The method according to claim 15, wherein the three ring segments are of equal length.

* * * * *